United States Patent Office 3,299,110
Patented Jan. 17, 1967

3,299,110
CONDENSATION OF CARBOXYLIC ACIDS AND OLEFINS TO PRODUCE ESTERS
Lloyd Albert Pine, Baton Rouge, La., assignor to Esso Research and Engineering Company, a corporation of Delaware
No Drawing. Filed Aug. 22, 1963, Ser. No. 303,921
18 Claims. (Cl. 260—410.9)

This invention relates to a process for producing esters from acids and olefins. More particularly, this invention relates to a process for the direct production of esters by the condensation of organic acids and aliphatic mono-olefins.

Heretofore, it has been known to the prior art to condense organic acids with certain mono-olefins to produce esters corresponding substantially to the starting acids and olefins, i.e., in structure, number of carbon atoms contained, etc. Further, it has been known to condense organic acids with mono-olefins in the presence of soluble catalysts, such as for example, boron trifluoride or concentrated sulfuric acid, with the formation of the desired ester being effected in good yields. Such condensation reaction was generally carried out entirely, i.e., both reactants and catalyst, in the liquid phase and hence suitable equipment included costly stirred reactors, baffled vessels, and the like. It is readily apparent, too, that the state of the art processes contained many other inherent disadvantages relative to these known processes.

One such disadvantage, for example, is that stemming directly from the type of catalyst heretofore generally employed, i.e. the corrosive nature of the catalysts per se, which made the continued use thereof detrimental to the condition of operation of the equipment. In addition, since the catalysts employed were usually soluble in the reaction mixture, removal of same at the termination of the reaction necessitated an extra step of washing or similar operation which consequently added to the equipment needed and the over-all process time expended. Another disadvantage inherent in the practice of the prior art was that the strong acids used as ester forming catalysts also promoted the polymerization of the olefin reactants causing the formation of highly undesirable polymer byproducts. Still another disadvantage resided in the fact that use of the reaction conditions and reactants hereinbefore mentioned also generally resulted in the isomerization of the terminal olefin starting materials employed into undesirable internal olefins.

It is an object of the present invention, therefore, to provide a process for the production of esters from organic acids and aliphatic mono-olefins. It is a special object to provide an improved process for the production of esters in high selectivity from carboxylic acids and certain mono-olefins. It is another object to provide a process for the production of esters from carboxylic acids and certain mono-olefins wherein said process is effected over a fixed-bed catalyst. Other objects will appear hereinafter.

The objects of this invention are accomplished by the following process of preparing esters which comprises contacting an organic acid, i.e., an acid having one or more carboxyl radicals, with an aliphatic mono-olefin in the presence of a molybdenum-containing catalyst, with said reaction most preferably being effected in the liquid phase over a fixed-bed catalyst. Accordingly, it has now been found that molybdenum catalysts selectively catalyze the reaction of carboxylic acids with aliphatic olefins to form esters corresponding to said carboxylic acids and said mono-olefins in number of carbon atoms and configuration of carbon chains and substituent groups. Thus, without any intent of limiting the scope of the present invention, the reaction between a fatty acid and a 1-olefin can be illustrated in accordance with the following equation:

$$R\overset{O}{\overset{\|}{C}}OH + C=CR' \longrightarrow R\overset{O}{\overset{\|}{C}}O\overset{C}{\overset{|}{C}}R'$$

where R and R' may be the same or different.

In general, any organic acid can be suitably employed, i.e., reacted with the mono-olefin reactant in the process to produce the esters of the present invention. Organic acids containing substitutent groups such as keto groups, nitro groups, halogen atoms, etc. are also applicable herein. The organic acid reactant can be branched chain, straight chain, or cyclic; saturated or unsaturated organic acid. Similarly, such acid may be an aliphatic or aromatic, monobasic, dibasic, tribasic, etc. acid. Thus, the organic acids suitable for use in the process of the present invention are the organic acids, for example, the saturated aliphatic monocarboxylic acids, saturated aliphatic dicarboxylic acids, aromatic acids, keto acids, amino acids, and the like, having from 1 to about 30 carbon atoms and preferably those having from 3 to 20 carbon atoms.

Non-limiting examples of suitable saturated aliphatic monocarboxylic acids include propionic, butanoic, valeric, caprylic, capric, lauric, myristic, stearic, carnaubic, isobutyric, pivalic, 2-ethylbutanoic, 2-ethylhexanoic, and the like.

Suitable saturated aliphtic dicarboxylic acids are, for example, succinic, glutaric, adipic, pimelic, sebacic, and the like.

Suitable aromatic acids include, by way of example, benzoic, phthalic, terephthalic and the like; keto acids include acetoacetic, pyruvic, levulinic, α-oxo-capric, α-aceto-caproic acid and the like.

In general, any $C_2$ to $C_{30}$ aliphatic, i.e., linear or cyclic, mono-olefin can be reacted with the above acid reactants to produce the products of the present invention. Thus, suitable olefins include types I, II, III and IV unsaturation. While types II, III and IV are operable in the process of the present invention they are found to be less desirable than the type I or alpha olefins. The preferred olefins used in the process of the present invention are those alpha mono-olefins having the structure:

$$R-CH=CH_2$$

where R is an alkyl radical having from about 3 to 28 carbon atoms.

Representative examples of the preferred alpha olefins having the structure $R-CH=CH_2$ wherein R is a $C_3$ to $C_{28}$ alkyl radical include 4-methyl-1-pentene, 1-pentene, 1-hexene, 1-heptene, 1-octene, 1-nonene, 1-decene, 5-methyl-1-nonene, 5,6,6-trimethyl-1-heptane, 1-hendecene, 1-dodecene, 6,8-dimethyl-1-decene, 1-tridecene, 1-tetradecene, 1-pentadecene, 1-hexadecene, 1-heptadecene, 1-octadecene, and the like.

The present invention may be applied to a specific acid and mono-olefin of the foregoing classes or mixtures of two or more of such acids and such mono-olefins.

The catalyst employed in the practice of the present invention is suitably a molybdenum-containing catalyst such as molybdenum sulfide ($MoS_2$). Other molybdenum-containing catalysts which may be employed include by way of example, molybdenum oxide, sulfided cobalt molybdate, molybdenum blue ($MoO_3$) and the like. These catalysts are truly selective in that the above object relative to selectivity is accomplished. Furthermore, the molybdenum-containing catalysts used in the process of the instant invention are extremely stable and can be used for protracted periods without apparent loss of activity.

The catalysts used in the present invention may, of course, be supported on inert carriers of any of the readily available types. Thus, examples of carrier materials which may be used as solid support components of the catalysts are the various aluminous and silicious materials of natural or synthetic origin such as bauxite, aluminum oxide, activated alumina, Kieselguhr, magnesium oxide, magnesium silicate, magnesium carbonate, barium sulphate, pumice, kaolin, activated carbon, clays, carborundum, alumdum, and the like. The catalysts preferably contain 2–25 wt. percent of the active material supported on a carrier of the type above described, e.g. activated carbon. A preferred molybdenum-containing catalyst is molybdenum sulfide having the following general composition: 5–15 wt. percent, preferably 8–10 wt. percent, e.g., 9 wt. percent molybdenum oxide on a carrier of the type above described, e.g. activated carbon, sulfided to saturation with $H_2S$.

The reaction conditions employed in the process, whether said process is a batch or continuous operation, are as follows:

Temperature, 100 to 600° F., preferably 300 to 600° F., for example 450° F.

Holding times, 1.0 to 30 hours, preferably 5 to 20 hours, for example 15 hours.

While elevated pressures are not critically necessary for this process, sufficient pressure, e.g. 100 to 500 p.s.i.g. is usually employed so as to retain at least a portion of the reactants in the liquid phase. The amount of catalyst utilized is from 20 to 70 wt. percent, preferably 40 to 60 wt. percent, for example 50 wt. percent, based on the total reactants, i.e., acid plus olefin supplied. Thus, if a continuous esterification operation is employed, feed rates of reactants over catalyst of 0.05 w./hr./w. to 0.5 w./hr./w. are utilized. The acids and mono-olefins are preferably employed in substantially equimolar amounts; however, the presence of large molar excesses of one of the reactants is found to have no deleterious effects.

The esters produced by the present invention are highly desirable and all, in general, are suitable for use in the manufacture or synthesis of plasticizers, of emulsifying or wetting agents, waxes, lubricants, drying compositions, and the like.

Specific applications of the process of the present invention are further illustrated by the examples which follow:

*Example 1*

In order to illustrate a batch reaction of a carboxylic acid on an alpha olefin, the $C_{24}$ ester of 2-ethyl hexanoic acid and 1-hexadecene was produced. In this experiment 36.1 grams of 2-ethyl hexanoic acid and 55.2 grams of 1-hexadecene were charged to a reaction vessel and heated at atmospheric pressure for a period of 21 hours, and at temperatures between 280 and 410° F. over 50 ml. of pilled molybdenum sulfide on activated carbon. At the end of the reaction period the resulting produce analyzed 51 wt. percent unreacted olefin, 31 wt. percent unreacted acid and 22 wt. percent ester. Gas chromatography of the product did not disclose any by-products or olefin isomerization and only one isomer of the $C_{24}$ ester was formed.

In an effort to show the criticality of the catalyst involved, a control reaction was run under identical conditions except that boiling chips were substituted for catalyst. There was no ester formation resulting from the control reaction.

*Example 2*

The $C_{26}$ ester of n-decanoic acid and 1-hexadecene was produced in a batch operation similar to Example 1. In this experiment 45.3 gms. of n-decanoic acid and 58.3 gms. of 1-hexadecene were charged to a reaction vessel and heated at atmospheric pressure for a period of 25 hours at temperatures between 440 and 470° F. over 50 ml. of pilled molybdenum sulfide on activated carbon. At the end of the reaction period, the resulting product analyzed 41 wt. percent unreacted olefin, 36 wt. percent unreacted acid, and 22 wt. percent ester. Gas chromatography of the produce did not disclose any by-products or olefin isomerization. Only one isomer of the $C_{26}$ ester was formed.

*Example 3*

The ester of benzoic acid and 1-hexadecene was formed by heating 25.0 gms. of benzoic acid and 45 gms. of 1-hexadecene for 21 hours at atmospheric pressure at temperatures between 475 to 498° F. over 50 ml. of pilled molybdenum sulfide on activated carbon. At the end of the reaction period, unreacted benzoic acid was removed by washing the product with potassium hydroxide solution. The oil layer, after water washing and drying analyzed 81 wt. percent unreacted olefin and 19 wt. percent ester. Gas chromatography did not disclose any by-products or olefin isomerization. Only one isomer of the ester was formed.

*Example 4*

In this experiment, 115.5 gms. of 2-octene and 144.2 gms. of n-octanoic acid were heated in a closed vessel under the vapor pressure of the contents for 23 hours at 437–500° F. over 140 ml. of pilled moybdenum sulfide on carbon catalyst. At the end of the reaction period the resulting product was analyzed by gas chromatography. It was found that 3.4 mol percent of the acid had been converted to ester. The ester product showed a doublet peak corresponding to two isomers formed from the internal olefin.

*Example 5*

The catalyst from Example 4 was washed with 1-octene and utilized to produce the $C_{16}$ ester of n-octanoic acid and 1-octene. In this experiment, 193.3 gms. of 1-octene and 104.5 gms. of n-octanoic acid were heated in a closed vessel under the vapor pressure of the contents for 5 hours at 480–496° F. over the catalyst used in Example 4. At the end of the reaction period, it was found that 8.8 mol percent of the acid had been converted to ester. There was no indication of by-products or olefin isomerization. Only one isomer of the $C_{16}$ ester was formed.

What is claimed is:

1. A process for producing esters which comprises contacting a carboxylic acid with an aliphatic mono-olefin at temperatures of from about 100 to 600° F. in the presence of a catalytic amount of a molybdenum-containing catalyst selected from the group consisting of molybdenum sulfide, molybdenum oxide, and sulfided cobalt molybdate.

2. The process of claim 1 in which the carboxylic acid contains from 1 to 30 carbon atoms.

3. The process of claim 1 in which the aliphatic mono-olefin contains from 5 to 30 carbon atoms.

4. The process of claim 1 in which the amount of catalyst utilized is from 20 to 70 weight percent based on the total amounts of reactants.

5. The process of claim 1 in which the catalyst is supported on an inert carrier.

6. A process for the direct production of esters which comprises contacting about equal amounts of a carboxylic acid containing from 3 to 20 carbon atoms with an aliphatic mono-olefin containing from 5 to 30 carbon atoms at temperatures of from about 100 to 600° F., substantially in the liquid phase and in the presence of from 20 to 70 weight percent of a pilled molybdenum-containing catalyst selected from the group consisting of molybdenum sulfide, molybdenum oxide, and sulfided cobalt molybdate, the amount of said catalyst being based on the total amount of acid and olefin employed.

7. The process of claim 6 in which the catalyst is molybdenum sulfide.

8. The process of claim 6 in which the catalyst is molybdenum oxide.

9. The process of claim 6 in which the catalyst is sulfided cobalt molybdate.

10. A continuous process for the direct production of esters which comprises continually contacting about equal amounts of a saturated aliphatic carboxylic acid containing from 3 to 20 carbon atoms with an alpha olefin having the structure:

$$R-CH=CH_2$$

where R is an alkyl radical having from about 3 to 28 carbon atoms at temperatures of from about 100 to 600° F., substantially in the liquid phase and in the presence of a molybdenum-containing catalyst selected from the group consisting of molybdenum sulfide, molybdenum oxide, and sulfided cobalt molybdate supported on an inert carrier, said reactants being introduced at a rate of reactant over said catalyst of from 0.05 to 0.5 w./hr./w.

11. The process of claim 10 in which the catalyst is molybdenum sulfide on carbon.

12. The process of claim 10 in which the catalyst is molybdenum oxide on carbon.

13. The process of claim 10 in which the catalyst is sulfided cobalt molybdate on carbon.

14. A continuous process for the direct production of the ester of 2-ethyl hexanoic acid and 1-hexadecene which comprises contacting about equimolar amounts of 2-ethyl hexanoic acid and 1-hexadecene at temperatures of from about 300 to 500° F., in the presence of a fixed-bed of 8–10% molybdenum sulfide on activated carbon, said reactants being introduced at a rate of from 0.05 to 0.5 w./hr./w.

15. A continuous process for the direct production of the ester of n-decanoic acid and n-hexadecene which comprises contacting about equimolar amounts of n-decanoic acid and n-hexadecene at temperatures of from about 300 to 500° F., in the presence of a fixed-bed of 8–10% molybdenum sulfide on activated carbon, said reactants being introduced at a rate of from 0.05 to 0.5 w./hr./w.

16. A continuous process for the direct production of the ester of benzoic acid and n-hexadecene which comprises contacting about equimolar amounts of benzoic acid and n-hexadecene at temperatures of from about 300 to 500° F., in the presence of a fixed-bed of 8–10% molybdenum sulfide on activated carbon, said reactants being introduced at a rate of from 0.05 to 0.5 w./hr./w.

17. A continuous process for the direct production of the ester of n-octanoic acid and 2-octene which comprises contacting about equimolar amounts of n-octanoic acid and 2-octene at temperatures of from about 300 to 500° F., in the presence of a fixed-bed of 8–10% molybdenum sulfide on activated carbon, said reactants being introduced at a rate of from 0.05 to 0.5 w./hr./w.

18. A continuous process for the direct production of the ester of n-octanoic acid and 1-octene which comprises contacting about equimolar amounts of n-octanoic acid and 1-octene at temperatures of from about 300 to 500° F., in the presence of a fixed-bed of 8–10% molybdenum sulfide on activated carbon, said reactants being introduced at a rate of from 0.05 to 0.5 w./hr./w.

References Cited by the Examiner

UNITED STATES PATENTS

| | | | |
|---|---|---|---|
| 2,198,046 | 4/1940 | Vierling | 260—410.9 |
| 3,014,066 | 12/1961 | Kerr et al. | 260—410.9 |

CHARLES B. PARKER, *Primary Examiner.*

D. D. HORWITZ, D. R. PHILLIPS, *Assistant Examiners.*